United States Patent
Kinjo

(10) Patent No.: US 6,967,737 B2
(45) Date of Patent: Nov. 22, 2005

(54) PRINT ORDERING METHOD, PRINTING SYSTEM AND FILM SCANNER

(75) Inventor: Naoto Kinjo, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 125 days.

(21) Appl. No.: 10/270,493

(22) Filed: Oct. 16, 2002

(65) Prior Publication Data

US 2003/0038970 A1 Feb. 27, 2003

Related U.S. Application Data

(63) Continuation of application No. 09/046,590, filed on Mar. 24, 1998, now Pat. No. 6,504,620.

(30) Foreign Application Priority Data

| Mar. 25, 1997 | (JP) | .................................. 9-72360 |
| Mar. 25, 1997 | (JP) | .................................. 9-72419 |
| Mar. 26, 1997 | (JP) | .................................. 9-73032 |

(51) Int. Cl.[7] .......................................... G06F 15/00
(52) U.S. Cl. .................... 358/1.15; 358/487; 358/527
(58) Field of Search ..................... 358/1.1, 1.5, 1.12, 358/1.13, 1.14, 1.15, 402, 434, 487, 407, 358/527

(56) References Cited

U.S. PATENT DOCUMENTS

| 5,079,724 A | * | 1/1992 | Shiraki et al. .............. 715/521 |
| 5,666,215 A | * | 9/1997 | Fredlund et al. ............ 358/487 |
| 5,757,965 A | | 5/1998 | Ohki |
| 5,926,285 A | | 7/1999 | Takahashi |

* cited by examiner

Primary Examiner—Mark Wallerson
(74) Attorney, Agent, or Firm—Sughrue Mion, PLLC

(57) ABSTRACT

In a printing system, a developed photo filmstrip is put in a film scanner to pick up image data from all picture frames photographed on the filmstrip. An index image of the picture frames is displayed based on the image data, so a user selects picture frames to print with reference to the index image while designating a print size to each picture frame. The image data of each designated picture frame is compressed at a rate that is decided according to the print size. The higher compression rate is used for the smaller print size. The compressed image data and print order data are transferred to a work station of a photofinisher. The photofinisher reproduces the original image data from the compressed image data, and makes prints based on the image data and print order data.

20 Claims, 13 Drawing Sheets

IDEAL
DENSITY
HISTOGRAM

ACTUAL
DENSITY
HISTOGRAM

US 6,967,737 B2

PRINT ORDERING METHOD, PRINTING SYSTEM AND FILM SCANNER

This is a continuation of application Ser. No. 09/046,590 filed Mar. 24, 1998; the disclosure of which is incorporated herein by reference now U.S. Pat. No. 6,504,620.

BACKGROUND OF THE INVENTION

1. Field of the Invention

The present invention relates to printing method and system which simplify ordering digital prints and improves efficiency of printing without lowering print quality. The present invention relates also to a film scanner for use in the printing system.

2. Background Arts

In the present photo-printing system, photographer or user is required to go to a retail D.P.E. (Develop, Print & Enlarge) agent in order to have the exposed photo film developed and printed at a photo-finisher. Thereafter, the user has to go to the retail D.P.E. agent again on or after a designated delivery date to receive the finished prints and developed photo film. Accordingly, the user has to go to the D.P.E. agent twice at every print order.

If the user does not wish to print all picture frames on the filmstrip, but wishes to check and designate some picture frames to print with reference to the developed filmstrip, the user must go to the D.P.E. agent more than twice. However, printing qualified picture frames only is economically preferable.

Meanwhile, digital printing is getting popular these days, as personal computers, digital cameras, image scanners and other high-tech digital imaging devices are getting widely used. Digital prints are made by processing image data on the personal computer and printing out hard copies through a personal-use printer of ink jet type or thermal type. The personal-use printer is not able to provide high print quality in comparison with professional printers. In addition, since the price of the personal-use printer is not so reasonable, the conventional digital print system turns out to be costly for most users.

SUMMARY OF THE INVENTION

In view of the foregoing, a prime object of the present invention is to provide a printing method and a printing system therefor, through which the user can order and receive high quality digital prints with ease at a low cost.

To achieve the above objects, a printing method of the present invention is comprised of: picking up digital image data from picture frames photographed on photo film; displaying video images of the picture frames based on the image data; designating picture frames to print with reference to the video images; assigning a print size to each of the designated picture frames; compressing the image data of each of the designated picture frames at a rate that is decided according to the print size, such that the higher compression rate is used for the smaller print size; and transferring the compressed image data and the print order data to a photo-finisher through a data communication device, for making prints based on the transferred image data and print order data.

According to a preferred embodiment of the invention, the image data is picked up from each of the designated picture frames at a resolution that is decided according to the print size, such that the higher resolution is used for the larger print size.

A printing system of the present invention is comprised of an imaging device for picking up digital image data from picture frames photographed on photo film; a data entry device for designating picture frames to print and entering print order data to each of the designated picture frames, print order data including a print size of each of the designated picture frames; a data processing device for processing the image data, the data processing device compressing the image data of each of the designated picture frames at a rate that is decided according to the print size; a data communication device for transferring the compressed image data and the print order data to a work station of a photofinisher; and a digital printer for making prints based on the transferred image data and print order data under the control of the work station.

According to a preferred embodiment, the imaging device picks up the image data from each of the designated picture frames at a resolution that is decided according to the print size.

BRIEF DESCRIPTION OF THE DRAWINGS

The above and other objects and advantages of the present invention will become apparent from the following detailed description of the preferred embodiments, when read in connection with the accompanying drawings which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
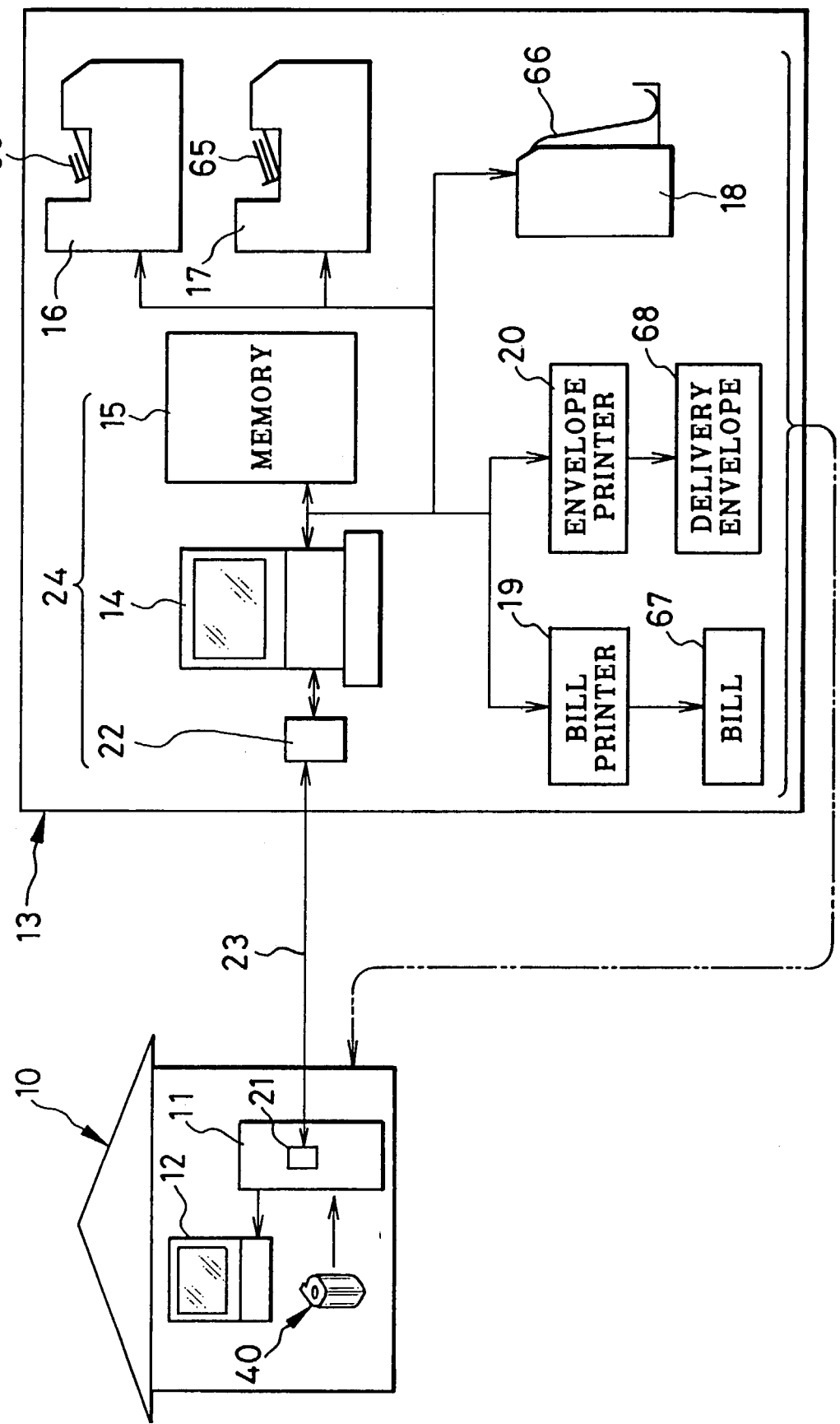
FIG. 1 is a schematic diagram showing the overall construction of a digital printing system according to an embodiment of the present invention.

In a printing system shown in FIG. 1, a user 10 of the printing system is provided with a film scanner 11 and a color monitor 12, whereas a photofinisher 13 is provided with a work station 14 for receiving and processing print order data from the user 10, a large scale memory 15, printers 16, 17 and 18, a bill printer 19 and an envelope printer 20. The film scanner 11 of the user 10 and the work station 14 are connected to each other by way of a well-known personal computer communication using modems 21 and 22 and a telephone circuit 23. The work station 14, the memory 15 and the modem 22 constitute a database 24.

Figure 2:
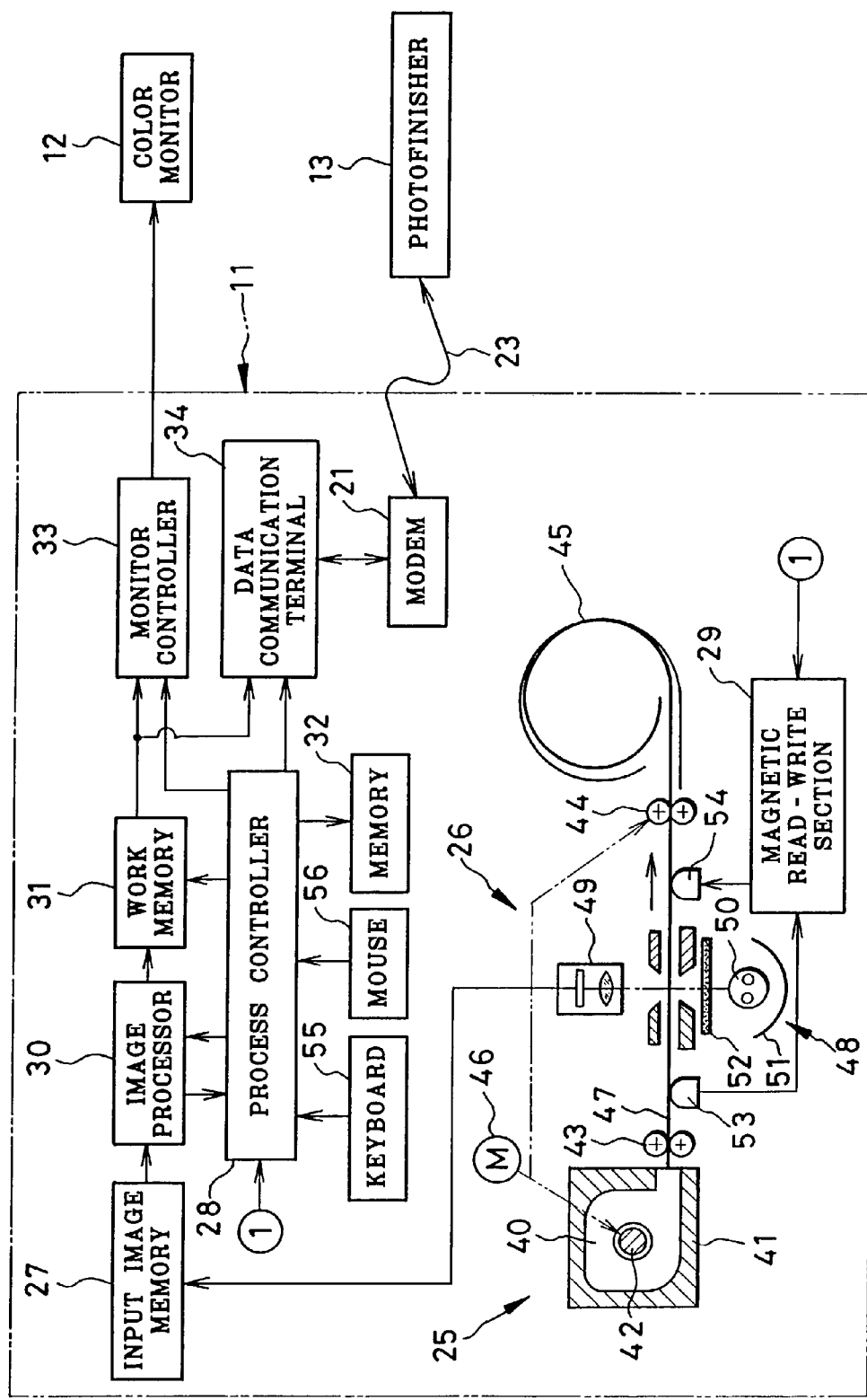
FIG. 2 is a schematic diagram of a film scanner of the digital printing system of FIG. 1.

As shown in FIG. 2, the film scanner 11 is constituted of a film feeding section 25, a frame imaging section 26, an input image memory 27, a process controller 28, a magnetic read-write section 29, an image processor 30, a work memory 31, a memory 32, a monitor display controller 33 and a data communication terminal 34.

The film feeding section 25 consists of a cartridge holder 41 for holding a photo film cartridge 40, a spool drive shaft 42, a guide roller pair 43, a feed roller pair 44, and a cylindrical film accepting portion 45. The cartridge holder 41 has a cavity and a lid for closing an open end of the cavity. When the photo film cartridge 40 is set in the cavity of the cartridge holder 41, the spool drive shaft 42 is engaged with a spool of the cartridge 40. The spool drive shaft 42 is driven by a motor 46 to rotate the spool in a winding direction or an unwinding direction. The motor 46 is also used for rotating the feed roller pair 44.

The cartridge 40 has a device for advancing a leader of a filmstrip 47 to the outside upon the spool being rotated in the unwinding direction. When the leader comes to squeeze into between the feed roller pair 44, the filmstrip 47 is transported by the rotation of the feed roller pair 44, and the spool drive shaft 42 is disconnected from the motor 46. The film accepting portion 45 accept the filmstrip 47 in the form of a coil. It is to be noted that the filmstrip 47 has been exposed and developed, so it has positive picture frames thereon.

The frame imaging section 26 and the magnetic read-write section 29 are disposed between the guide roller pair 43 and the feed roller pair 44. The frame imaging section 26 consists of a light source 48 and an imaging device 49. The light source 48 consists of a fluorescent lamp 50 whose light emission properties are suitable for the photo film, and a reflector 61 and a diffusion plate 52. The imaging device 49 is constituted of an image scanner having a line image sensor, which scans the picture frames synchronously with the film feeding, detecting image data from the picture frames. The image data is stored in the input image memory 27.

The magnetic read-write section 29 reads photographic data from a transparent magnetic recording layer of the filmstrip 47 through a magnetic head 54, and sends the photographic data to the process controller 28. In this embodiment, the photographic data includes frame serial numbers that are used for identifying individual picture frames. The photographic data may include the date of photography or a title. Then, the date of photography or the title is displayed near by the corresponding picture frame on the color monitor 12. It is also possible to enter data, such as title data for a picture frame, by the film scanner 11, and write the title data on the magnetic recording layer in association with the corresponding picture frame by the magnetic head 54 of the magnetic read-write section 29.

The image processor 30 process the image data by use of the work memory 31, for γ-correction, color correction, trimming, data synthesizing for merge printing, image magnification or reduction, and/or data compression.

The process controller 28 is constituted of a microcomputer, and controls the respective elements of the film scanner 11 in a sequential fashion. A keyboard 55 and a mouse 56 are connected to the process controller 28. The process controller 28 may be switched over between a rough imaging and monitoring mode, a print option mode, a fine imaging mode and a print ordering mode by operating the keyboard 55 and the mouse 56.

In the rough imaging and monitoring mode, an index image consisting of positive images of a plurality of picture frames, e.g., all picture frames of the filmstrip 47, which are reduced in size and arranged in a matrix, is displayed on the color monitor 12. The process controller 28 drives the frame imaging section 26 to pick up image data from the respective picture frames, and writes the image data in the input image memory 27. Because high resolution image data is not necessary for producing the index image, the imaging device 49 picks up image data at a low resolution by the pixel combining. The image processor 30 sequentially writes the image data picked up at the low resolution in the work memory 31, producing data of the index image. The monitor controller 33 reads out the data of the index image from the work memory 31, to display the index image on the color monitor 12.

In the print option mode, the user selects a picture frame to print with reference to the index image on the color monitor 12. Specifically, the user places a cursor on the picture frame to print and clicks a designated push switch of the mouse 56. It is alternatively possible to enter the frame serial number of the picture frame to print through the keyboard 55. It is possible to use other data input device, e.g., a light pen and a touch panel sensor.

As print option data, print number data indicating the number of prints to make from each picture frame, and print size data are combined with frame number data indicating the frame serial number of the selected picture frame. In the present embodiment, the default value of the print number data is "1", and the default value of the print size data is "standard size". If the user wishes more than one print from one picture frame, or a special print size, the user enter an appropriate number or size by a conventional method. The entered print option data is stored in the memory 32.

The print size data designates-an aspect ratio such as a standard size, a wider high-vision size, or a panoramic size, as well as a paper size such as E size, L size, cabinet size, A1, A2, A3 or A4 size, or other large size. As will be described later, silver-salt photo printers are used for E size, L size and cabinet size, whereas ink jet printers or thermal printers are used for larger sizes.

In the fine imaging mode, the process controller 28 reads out the frame serial number and the print size of the picture frame from the memory 32, and sets up a resolution of the imaging device 49 according to the print size: the higher resolution is selected for the larger size print. If the high-vision size or the panoramic size is designated, the process controller 28 controls the imaging device 49 to pick up image data from a part of the picture frame that corresponds in aspect ratio to the designated size.

In the print ordering mode, the user enters print order data other than the print option data. The print order data includes delivery time data, delivery style data, payment option data, and user ID data. The entered print order data is stored in the memory 32, and displayed on the color monitor 12 in the next print ordering mode as well as in the present print ordering mode. Thus, the user has to enter only those print order data items that are to revise. When the user terminates entering the print order data, the process controller 28 drives the data communication terminal 34 to transfer the print order data to the database 24 of the photofinisher 13 through the telephone circuit 23.

The user ID data is to identify the user, and is constituted of use's name, address, zip code, phone number and user ID number. When the user 10 registers with the photofinisher 13 before or at the first printing order, the photofinisher 13 gives the user ID number and a password to the user 10. Next time, the user has only to enter the user ID number and password, so the user 10 is identified by the database 24. The user may register those combinations of print order data that are frequently adopted by the user, as number codes, so the user may enter the print order data by entering the number code.

The delivery time data indicates an expected delivery date and time. Several kinds of dates are set up by a photofinisher in advance, and an appropriate one is selected from these options, e.g., a delivery within 12 hours after receiving order, a delivery within 24 hours after receiving order or a delivery within two days after receiving order. Instead of that, an expected delivery date and time can be designated. The delivery style data indicates the way of delivery, so an appropriate one is selected from several options, such as by mail, by a home delivery service or by hand-delivery at a retail D.P.E. agent.

The payment option data indicates the way of payment. If a delivery by mail or home delivery service is expected, payment by credit card, by prepaid card, by electronic money or by automatic transfer from user's account to photofinisher's account, or payment into photofinisher's account may be selected. In addition, payment in cash may be selected if hand-delivery is selected.

The work station 14 of the photofinisher 13 has a high-functional high-speed computer because of a larger amount of data to deal with. The work station 14 is set up with well-known database software. The database software corresponds to the image processing-ordering software of the film scanner 11. Upon receipt of the print order data from the user 10, the work station 14 sends back data of a reception number, a possible delivery time and the charge of printing to the user 10.

The above-mentioned digital printers 16 to 18 are loaded with different sizes of photographic materials from each other, and with a recording medium, so that these printers 16 to 18 make prints in different sizes. The printers 16 and 17 are silver-salt type color digital printers, which make scanning-exposure of silver-salt color photo paper (called color paper) to an optical image that is formed based on digital data. The printers 16 and 17 use positive-to-positive type color paper that is exposed to positive images.

Figure 3:
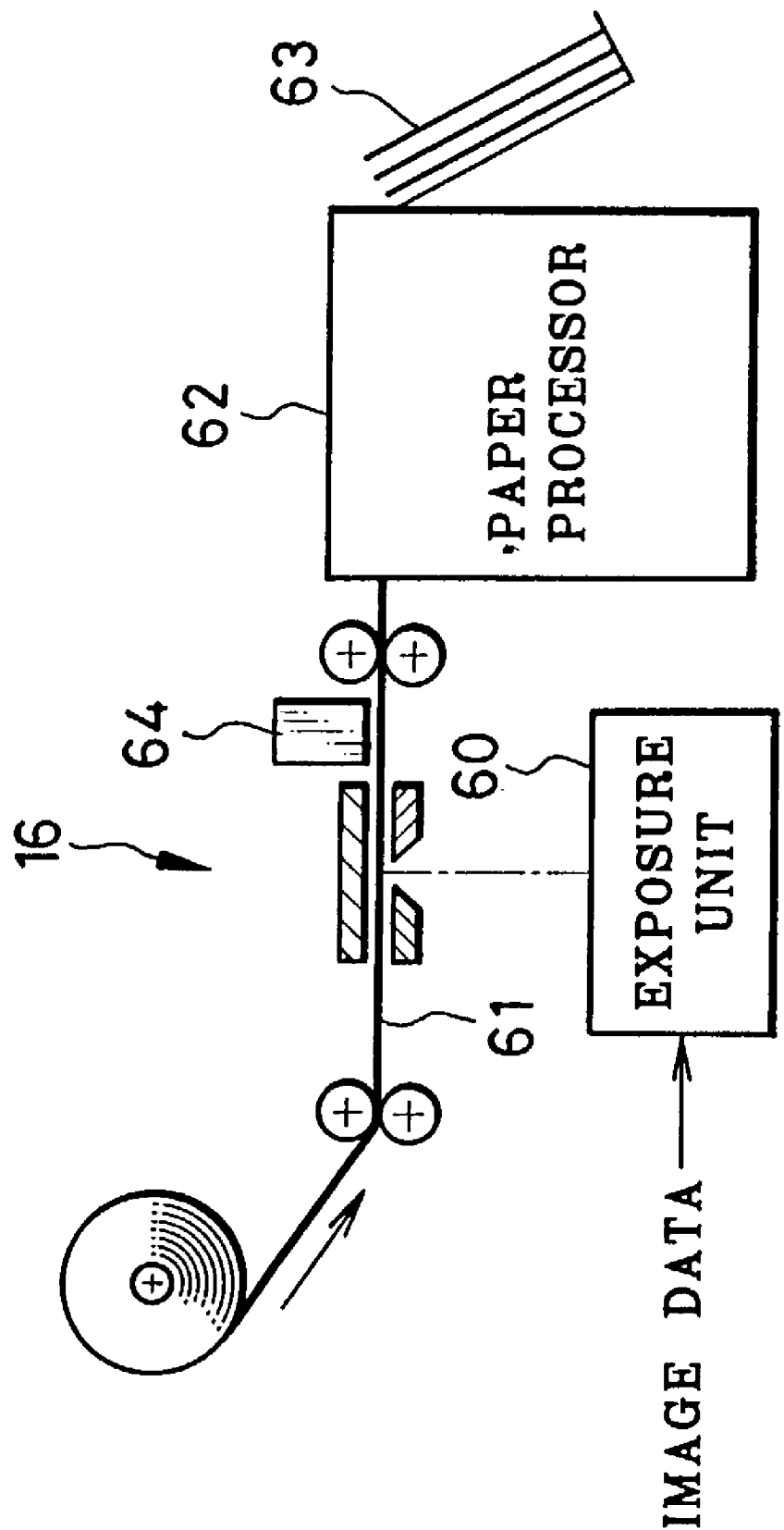
FIG. 3 is a schematic diagram of a digital printer.

As shown in FIG. 3, the silver-salt type color digital printer 16 is provided with an exposure unit 30 of Laser scanning-exposure type, which modifies the Laser beam based on the image data. Synchronously with transportation of color paper 61, scanning-exposure of each of yellow, magenta and cyan photo sensitive layers of the color paper 61 is carried out, to record each image on the color paper 61.

The exposed color paper 61 is developed by a paper processor 62, then it is cut into individual frames based on cut marks. In this way, a print 63 of L size is made out. A back printer 64 is provided in the silver-salt type color digital printer 16. The back printer 64 records the reception number, the user ID number and bar codes of these numbers on the back of the color paper 61 corresponded to each frame. The other silver-salt type color digital printer 17 has the same composition as the color digital printer 16. The printer 17 is loaded with color paper for cabinet size print, to make cabinet size prints 65.

The exposure unit 60 of the Laser scanning-exposure type may be replaced with an area-exposure type printer using CRT and LCD panel, or a line-exposure type printer. Instead of modifying the light beam, it is possible to use a micro-mirror device for the scanning-exposure. The micromirror device is the device in which small size micromirrors are arranged in a line or matrix, and which deflects incident light by controlling tilt angle of each micromirror.

If negative-to-positive type color paper is used, the image data is subjected to conversion from positive to negative. This positive/negative conversion is carried out in image processing sections of the digital printers 16 to 18, or it can be carried out in an image processing section of the work station 14. In the image processing sections of the digital printers 16 to 18, γ-correction and matrix correction are carried out to make density and color balance of the consequent prints best.

The printer 18 is constituted of a well-known ink jet type color digital printer. When the print size data designates a large size print, such as A0 to A4 size, the ink jet type printer 18 is selected. Therefore, different sizes of recording paper strips 66 are set in the printer 18, and one recording paper is selected according to the designated print size. A back printer is also provided in the printer 17, to print the reception number, the user ID number, and their bar codes on the back of the recording paper strip 66.

The bill printer 19 prints out a bill 67 based on the data of the work station 14. The envelope printer 20 prints user's address, name and zip code on a delivery envelope 68. Besides, these printers 19 and 20 respectively print the reception number, the user ID number and bar code of these numbers on the bill 67 and the delivery envelope 68, for the sake of correlation between the finished prints and the bill 67 and the delivery envelope 68.

Figure 4:
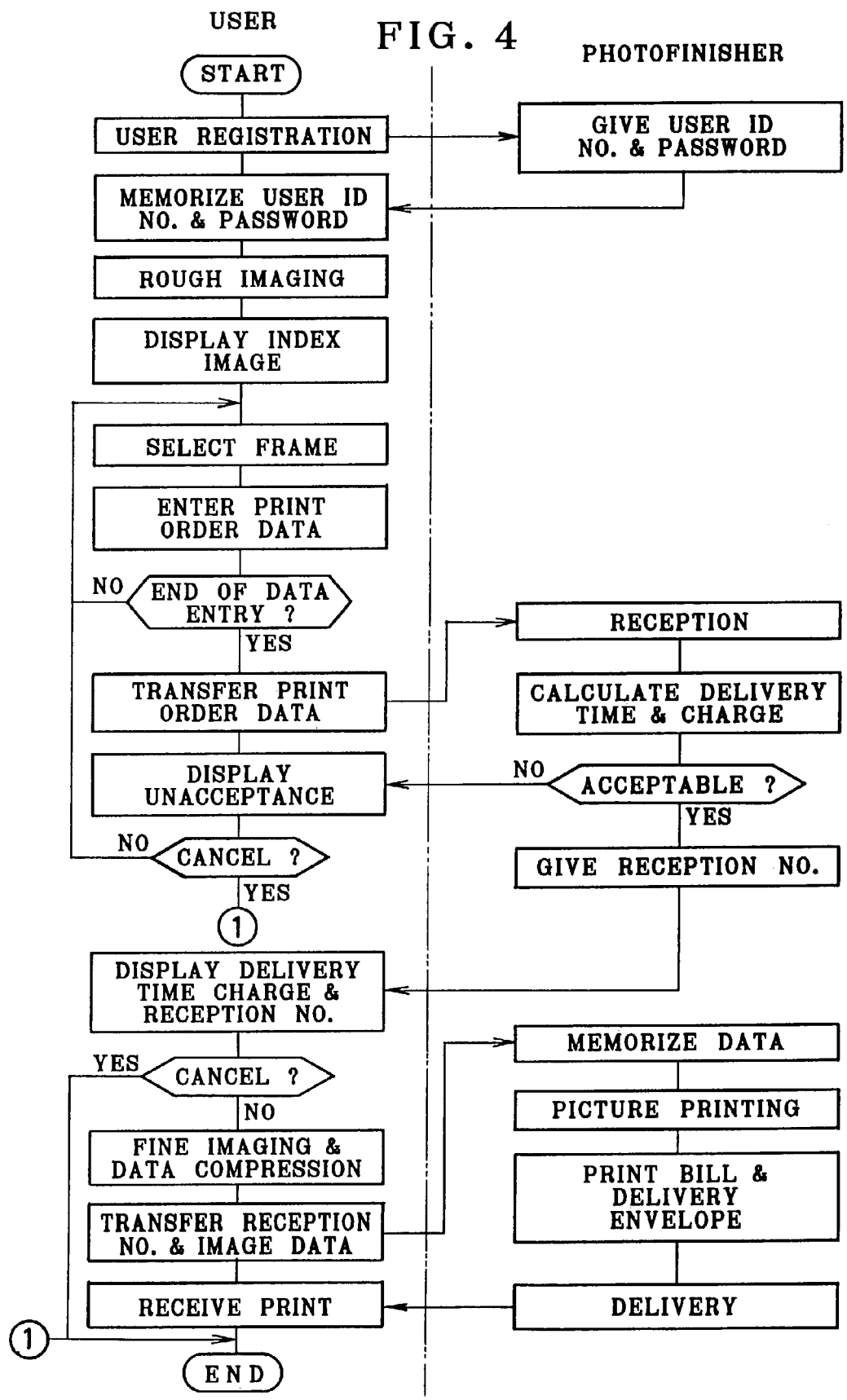
FIG. 4 is a flow chart illustrating an operation sequence of the digital printing system of FIG. 1.

Now the operation of the above embodiment will be described with reference to FIG. 4.

The user 10 gets the list of photofinishers 13 to select an appropriate photofinisher 13 from the list, considering location, charge, available print formats, available delivery style, etc. Then, the user 10 accesses the database 24 of the selected photofinisher 13, to apply for registration. Then, the work station 14 gives a user ID number and a password to the user 10. Once the user 10 is registered as a member of the printing system, the work station 14 receives any printing orders from the user 10 based on the user ID number and the password.

The user 10 puts the film cartridge 40 in the film scanner 11, and sets the process controller 28 to the rough imaging and monitoring mode. Then, the imaging device 49 picks up image data from all picture frames on the filmstrip 47 at the low resolution. The image data is processed in the imaging processor 30, and is sequentially written in the work memory 31 to produce data of an index image. The index image is displayed on the color monitor 12 through the monitor controller 39.

Next, the user 10 switches the process controller 28 to in the print option mode, and specifies picture frames to print and enter the print size data and the print number data by the mouse 56. The entered print order data is written in the memory 32. After the print order data entry is accomplished, the process controller 28 is switched to the fine imaging mode. In this mode, based on the print size data read out from the memory 32, the imaging device 49 picks up image data from the picture frames to print each at a higher resolution that is determined according to the designated print size. That is, the pixel density is set the higher for the larger size print. If the high-vision size or the panoramic size is designated, the process controller 28 controls the imaging device 49 to pick up image data from a part of the picture frame that corresponds in the aspect ratio to the designated size.

The image data picked up in the high resolution mode is processed by the image processor 30. For example, the image processor 30 performs γ-correction, matrix correction, letter-illustration composition, magnification or reduction, trimming, image synthesizing, and so forth. After the image processing is complete, the processed image data is compressed preferably by JPEG (Joint Photographic Experts Group) compression method. But another well-known type data compression method is applicable. The data compression rate varies depending upon the print size. For the larger size, the lower compression rate is used to keep adequate image quality. As the print size becomes smaller, the bad influence of data compression on the image quality is less conspicuous, so a higher compression rate is available. The compressed image data is written in the memory 32 in association with the print order data.

After the image data is picked up from all of the picture frames to print, the process controller 28 is switched to the print ordering mode for entering the delivery time data, the delivery style data and the payment option data. Thereafter, in response to a user's instruction, the process controller 28 sends the print order data to the database 24 of the photofinisher 13.

In the work station 14, the total number of presently accepted orders and the delivery times thereof are managed. Each time the database 24 receives the print order data, it is determined by calculation if it is possible to deliver the prints in the expected delivery time. Concretely, the time necessary for photofinishing the ordered prints is calculated based on the print size and the requisite number of prints, the number of orders from other users, and the processing capacity of the photofinisher 13. By adding the time taken for photofinishing to the time taken for delivery, the earliest possible delivery time is calculated. Then, the work station 14 checks whether the earliest possible delivery will be in time for the expected delivery time or not. If the calculated delivery time exceeds the expected delivery time, the work station 14 sends a message of unacceptance to the user 10. In that case, the user 10 has either to change the expected delivery time, or to cancel the order. If the calculated delivery time is no later than the expected delivery time, the work station 14 sends a reception number, the delivery time and the charge to the user 10.

The film scanner 11 of the user 10 displays the reception number, the delivery time and the charge on the color monitor 12. If the user accepts the displayed delivery time and charge, the user sends the compressed image data with the reception number to the photofinisher 13. To cancel the printing order, the user does not send the image data. Thus, the user does not need to transfer the image data unless the user confirm the response from the photofinisher, the printing system of the present invention cuts unnecessary cost of data transmission.

Upon receipt of the reception number and the compressed image data from the user 10, the work station 14 correlates the image data with the print order data based on the reception number, and writes the image data in association with the relating print order data in the memory 15. If the user does not need to confirm the delivery time and the charge, the user may send the image data concurrently with the print order data.

Then, the work station 14 reads out the compressed image data and the print order data from the memory 15 in the order of delivery time, expands the compressed image data into the original size, and makes prints in correspondence with the associated print order data. At this time, the work station 14 selects one of the printers 16 to 18 according to the print option data. Thus, a designated number of prints are made in the designated print size. For instance, if the normal L size is designated, the printer 16 is selected to make L size prints 63. If the cabinet size is designated, the printer 17 is selected to make cabinet size prints 65. If the A3 size is designated, the ink jet printer 18 is selected to make A3 size prints 36.

The back printer 64 of each printer 16 to 18 prints the reception number, the user ID number and the bar code of these numbers on the back of each print 63, 65 or 66. The reception number, the user ID number and the bar code are used to correlate each print with the bill 67 and the delivery envelope 68 in the delivery process.

Bill printing and envelope printing are carried out in parallel with the photo-printing or before or after the photo-printing. In the bill printing, the work station 14 prints charge specifications, the reception number, the user ID number and the bar code of these numbers with a fixed format by using the bill printer 19, to issue a bill 67. Similarly, the envelope printer 20 prints user's zip code, address, name, phone number, category code of delivery, reception number, and ID number and bar code thereof on the delivery envelope 68. The user's zip code, address, name and so forth are specified based on the user ID number of the print order data. When the delivery envelope 68 has a transparent window, the print of address on the delivery envelope can be omitted by printing these on the bill 67. Different kinds of delivery envelopes 68 are prepared for different print sizes. For instance, for the big size print such as A0 to A3 size, a cylindrical bag is used. In place of direct printing on the delivery envelope 68, it is possible to print on a label, and put the label on the delivery envelope 68.

Since the finished prints 63, 65 or 66, the bill 67 and the delivery envelope 68 have the same reception number and bar code, these can be correlated with one another based on the reception number and bar code. After packing, the delivery style is selected according the delivery style data, among from the mail, home delivery service and so forth. The packing may be carried out by hand with reference to the reception number. It is possible to pack the finished prints automatically based on the bar code read by a bar code reader, and then sort the delivery envelopes 68 into groups according to the designated delivery style.

The print charge is paid in the way the payment option data designates. For payment by a prepaid card, the user purchases the prepaid card at the photofinisher 13 or its agency, and enters the card ID number as the payment option data. By doing so, the work station 14 makes prints without charging, up to the limit of the prepaid card.

It is possible that the user 10 first sends only the print size data to the photofinisher 13, so the photofinisher 13 determines the best combination of a resolution of the imaging device 49 and a compression rate of the image data according to the print size. The photofinisher 13 sends these values as control data back to the user 10. Then, the resolution and the compression rate are properly adapted to the print size in accordance with the control data. It is possible to modify either the resolution or the compression rate according to the print size, though the above embodiments modify both values in combination.

Figure 5:
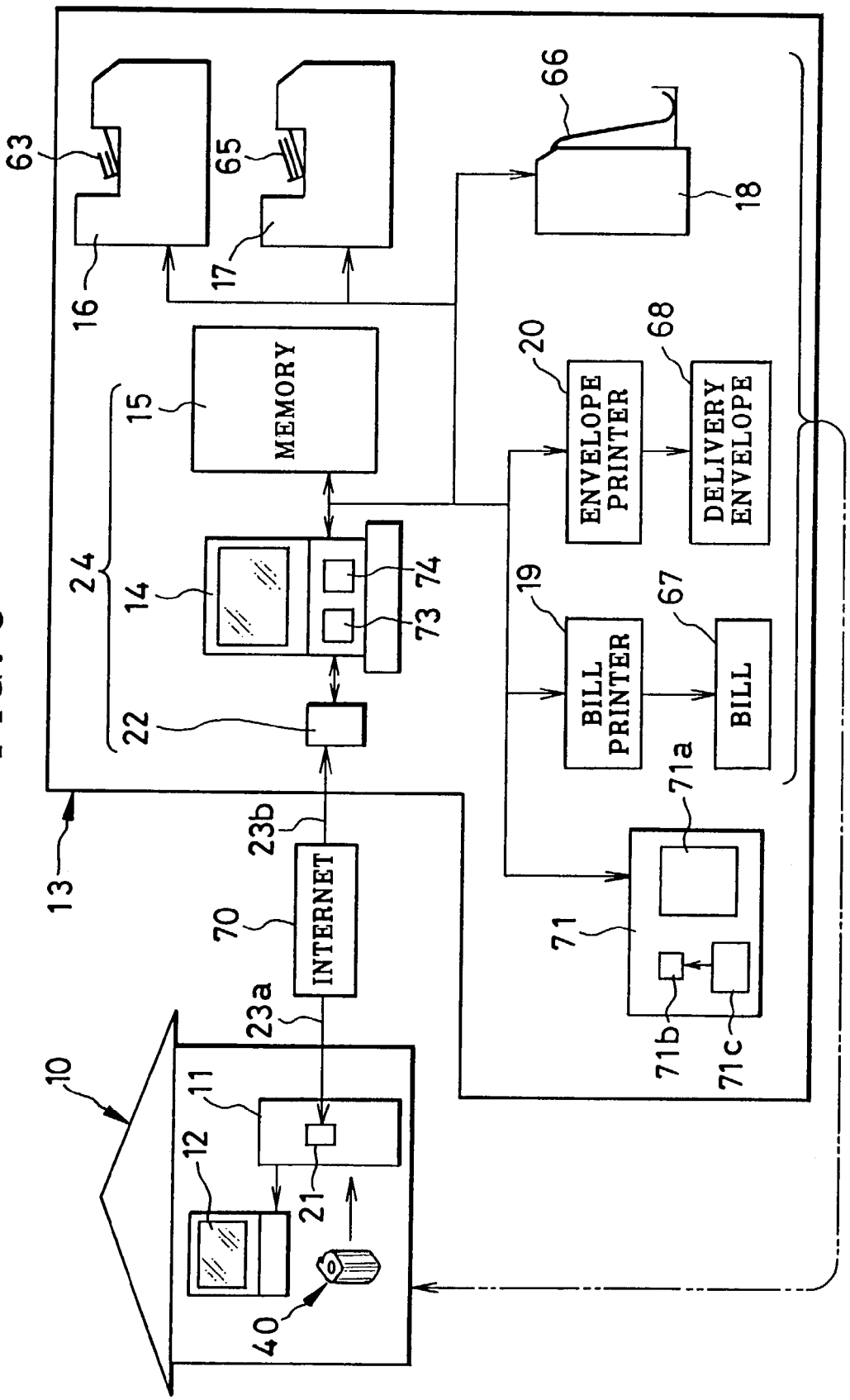
FIG. 5 is a schematic diagram showing the overall construction of a digital printing system according to an embodiment of the present invention.

FIG. 5 shows a printing system according to another embodiment of the invention, whose fundamental construction is equivalent to that of the first embodiment. Therefore, the following description relates only to those features which are essential to the present embodiment. In the printing system of FIG. 5, Internet 70 is used for data communication between a photofinisher 13 and users 10. Therefore, image data is encrypted or encoded before being transferred through the Internet 70.

There are two types cryptographic methods. In one method, called secret key encryption, the encryption algorithm is disclosed, but the encryption key is secret. For example, conventional FEAL (Fast data Encipherment Algorithm) and DES (Data Encryption Standard) are the secret key encryption method. The other method, called disclosed key encryption, uses disclosed encryption keys. Since the disclosed key encryption takes much calculation time for both encrypting and decoding, the present embodiment adopt the secret key encryption.

As shown in FIG. 5, a film scanner 11 and a color monitor 12 are installed in a user 10, whereas a work station 14, a memory 15, printers 16 to 20, and a film processor 71 are installed in the photofinisher 13. The film scanner 11 and the work station 14 are connected to the Internet 70 through modems 21 and 22 and telephone circuits 23a and 23b. The work station 14 is provided with an encryption key generator 73 and a decoder 74. The encryption key generator 73 gives data of a private encryption key to each individual user when the user registers with the photofinisher 13. Concurrently, the work station 14 gives the user 10 a user ID number and a password. The user 10 may apply for the registration to the photofinisher 13 through the Internet 70 or other communication device. The encryption key data is stored in the memory 15 in association with the date of setting-up the encryption key data, and user ID data including the user ID number. Once the user 10 registers with the photofinisher 13, the user 10 can access the work station 14 by entering the user ID number and the password. It is preferable to periodically revise the encryption key data for each user, to reduce damage in case the encryption key data should be stolen.

Figure 6:
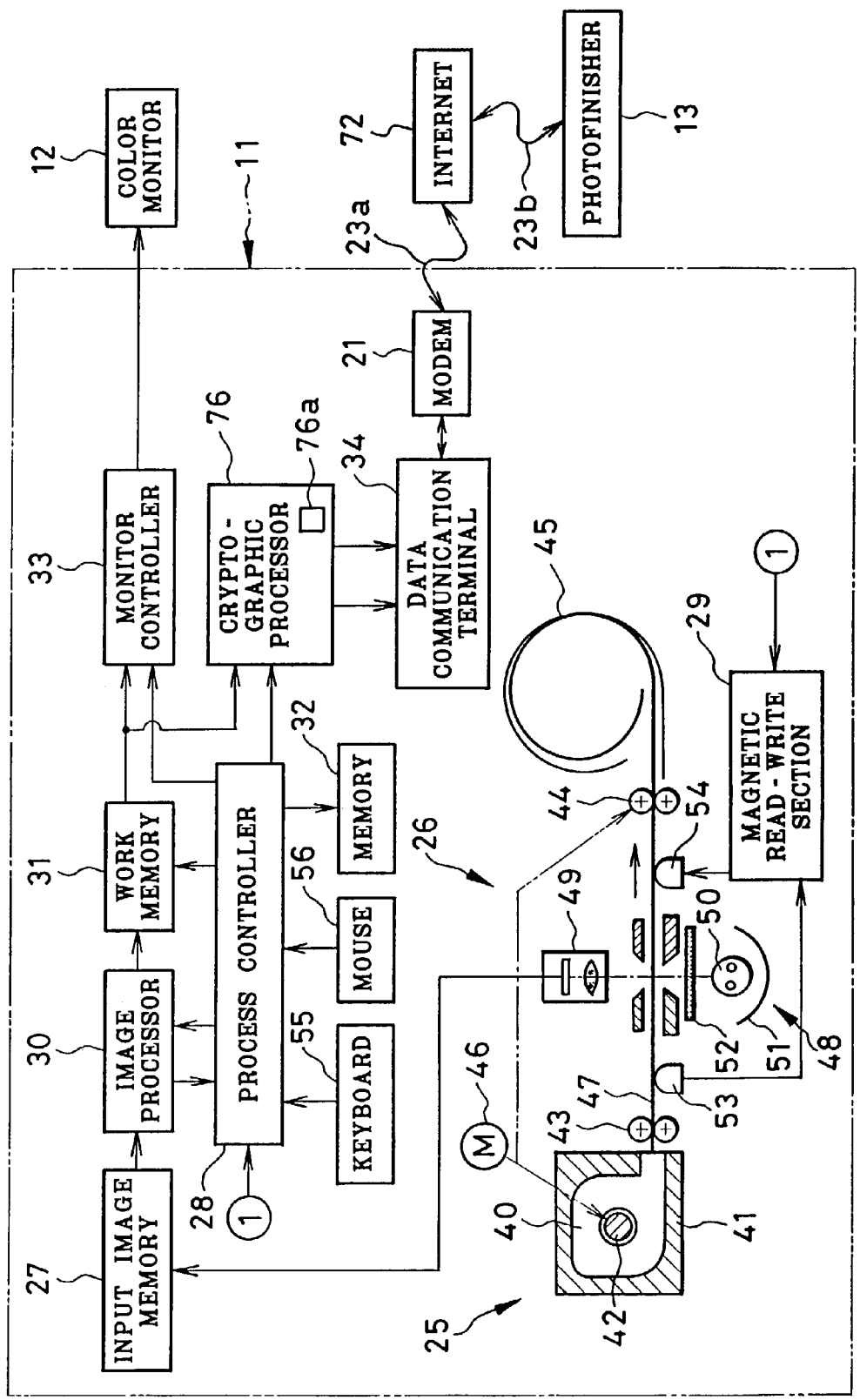
FIG. 6 is a schematic diagram of a film scanner of the digital printing system of FIG. 5.

On the other hand, as shown in FIG. 6, the film scanner 11 of the user 10 is provided with a cryptographic processor 76. The cryptographic processor 76 encrypts or encodes image data of the picture frames according to the disclosed encryption algorithm by use of the private encryption key data given by the photofinisher 13. With reference to the user ID number, the decoder 74 retrieves the encryption key data of the user 10 from the memory 15, and decodes the encrypted image data by use of the encryption key data.

According to the secret key encryption method, the user 10 as well as the photofinisher 13 should keep the private encryption key data secret from others. For security sake, it is undesirable to transfer the private encryption key data through the Internet 70. According to the present embodiment, the private encryption key data is recorded on a magnetic recording layer of each filmstrip when the filmstrip is forwarded from the user 10 to the photofinisher 13 for development.

For this purpose, the film processor 21 is provided with a data read-write section 21c having a magnetic read-write head 21b besides a conventional film developing section 71a. The film processor 21 not only develops photo filmstrips, but also records the encryption key data and the user ID data on magnetic recording layers of filmstrips. Specifically, when the photofinisher 13 receives a photo film cartridge 40 containing an exposed filmstrip 47, the photofinisher 13 reads film ID data from the cartridge 40, and stores the film ID data in the memory 15 association with the user ID data. When the film cartridge 40 is placed in the film processor 21, the data read-write section 21c reads out the film ID data from the transparent magnetic recording layer of the filmstrip 47, and sends it to the work station 14.

The work station 14 retrieves the user ID data and the private encryption key data of that user 10 from the memory 15 by use of the film ID data, and sends them to the data read-write section 21c. Then, the data read-write section 21c writes the encryption key data, the set-up date of the encryption key data and the user ID data on the magnetic recording layer of the filmstrip 47. As the user ID data is associated with the film ID data in the memory 15, it is possible to omit writing the user ID data on the magnetic recording layer.

The developed filmstrip 47 is rewound back into the cartridge 40, and is returned to the user 10. When the user 10 puts the cartridge 40 in the film scanner 11, the film scanner 11 picks up image data from picture frames on the filmstrip 47. A magnetic read-write section 29 of the film scanner 11 reads out the encryption key data and the set-up date of the encryption key data from the magnetic recording layer of the filmstrip 47 concurrently with other data, and sends the data to a process controller 28. The process controller 28 writes the encryption key data and the set-up date of the encryption key data in a memory 76a that is built in the cryptographic processor 76. If the memory 76a already stores any encryption key data therein, the registration dates of these two pieces of encryption key data are compared to each other. If the registration dates are identical, the already stored encryption key data is maintained. If the memory 76a stores encryption key data whose registration date is older than that of the encryption key data recorded on the filmstrip 47, the older encryption key data is replaced by the new one. The cryptographic processor 76 encrypts image data by use of the encryption key data stored in the memory 76a.

Figure 7:
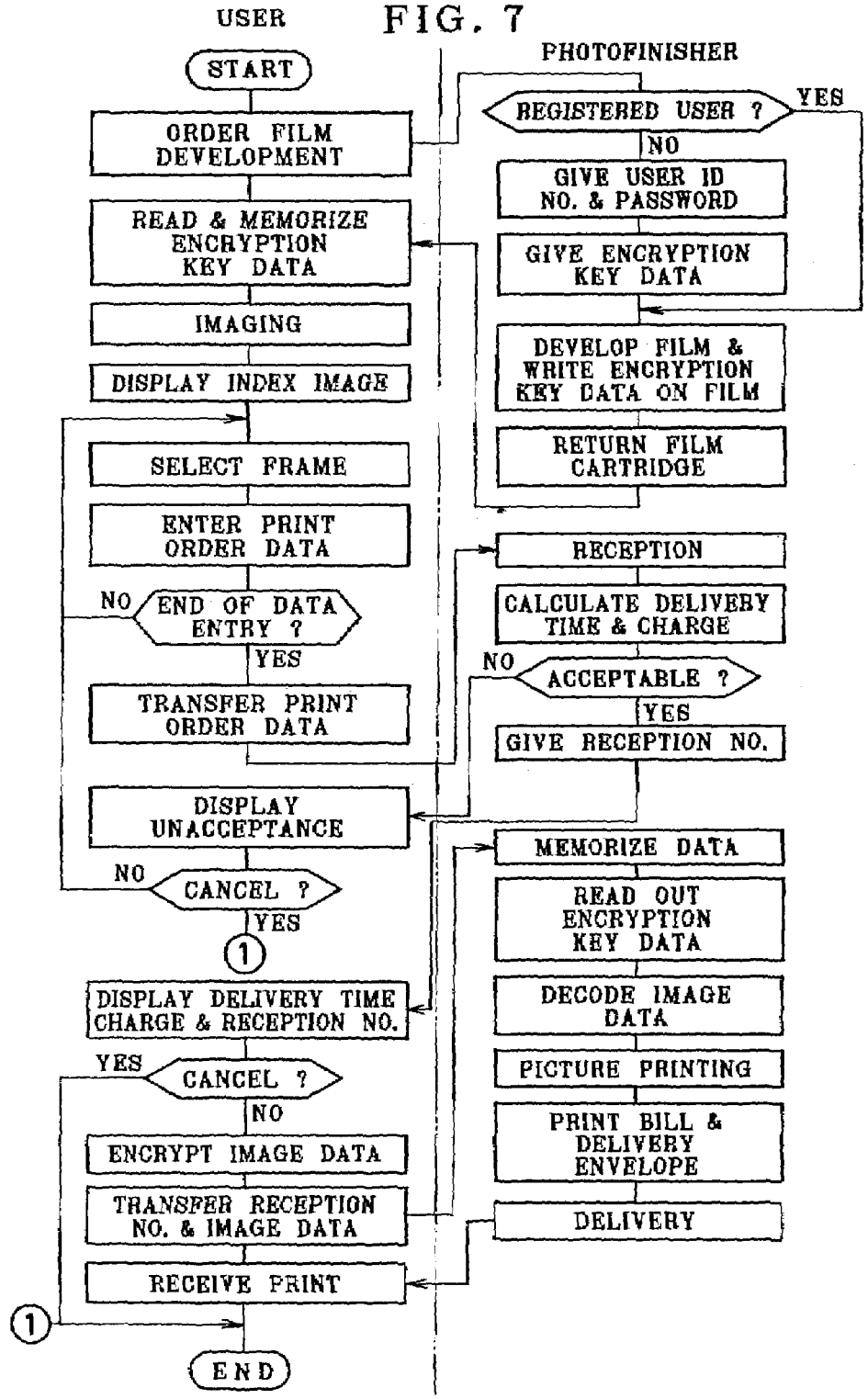
FIG. 7 is a flow chart illustrating an operation sequence of the digital printing system of FIG. 5.

Now the operation of the embodiment of FIGS. 6 and 7 will be described with reference to FIG. 7.

First, the user 10 forwards the photo film cartridge 40 to the photofinisher 13, ordering development of the filmstrip 47. The photofinisher 13 checks if the user 10 is registered. If not, the photofinisher 13 gives the user 10 a user ID number, a password and private encryption key data. The user ID number and the encryption key data are stored in the memory 15 along with information about the user 10, such as the user's name, address, telephone number, and zip code. Concurrently, the photofinisher 13 reads out film ID data from the photo film to develop, and writes the film ID data in association with the user ID data in the memory 15.

The photofinisher 13 put the photo film cartridge 40 in the film processor 21 to develop the filmstrip 47. Simultaneously, the film ID data from the filmstrip 47 is read through the magnetic read-write head 21b of the data read-write section 21c, and the user ID data and the private encryption key data of that user 10 are retrieved from the memory 15 by use of the film ID data. Then, the encryption key data, the set-up date of the encryption key data and the user ID data are written on the magnetic recording layer of the 15 filmstrip 47 through the magnetic read-write head 21b. The developed filmstrip 47 is rewound back into the cartridge 40, and is returned to the user 10.

When the user 10 puts the cartridge 40 in the film scanner 11, the encryption key data and the set-up date of the encryption key data are read out from the magnetic recording layer of the filmstrip 47 through a magnetic read-write section 29 of the film scanner 11. If the memory 76a stores encryption key data whose registration date is older than that of the encryption key data recorded on the filmstrip 47, the encryption key data is updated.

Thereafter, image data is picked up from all picture frames on the filmstrip 47. In this embodiment, image data is picked up at high resolution, and data of an index image is produced from the image data by pixel-thinning. It is also possible to pick up image data of all picture frame at low resolution by the pixel combining, for producing and displaying an index image, and thereafter pick up image data of selected picture frames at higher resolution, in the same way as in the first embodiment.

The user 10 selects picture frames to print, and transfers print order data including the user ID number to the work station 14 of the photofinisher 13 in the same way as in the first embodiment. Then, the work station 14 of the photofinisher 13 sends back data of the delivery due time and the estimated charge along with a reception number. If the user accepts the due time and the charge, the user 10 instructs the film scanner 11 to transfer image data of the selected picture frames. Then, the cryptographic processor 76 reads the encryption key data from the memory 76a, and encrypts image data by use of the encryption key data. The encrypted image data is transferred to the work station 14, along with the reception number.

It is possible to encrypt the print order data too. In that case, the user ID number is attached to the encrypted print order data as being transferred to the photofinisher 13. If the user does not need to confirm the delivery time and the charge, the user may send the encrypted image data concurrently with the print order data.

Upon receipt of the reception number and the encrypted image data from the user 10, the work station 14 correlates the image data with the print order data based on the reception number, and stores the correlated data in the memory 15. The decoder 74 retrieves the encryption key data from the memory 15 based on the user ID number included in the print order data, and decodes the encrypted image data. Thereafter, prints are made from the decoded image data and are delivered to the user 10 in the same way as described with respect to the first embodiment.

In the above embodiment, the film processor 21 is used to record encryption key data on the magnetic recording layer of the filmstrip 47. In alternative, the encryption key data may be written on the filmstrip 47a in an order reception device of the photofinisher 13, before the filmstrip 47 is developed. It is also possible to record the encryption key data on the filmstrip 47 by a specific data recording device, after the filmstrip 47 is developed by the film processor 21. The encryption key data may be recorded optically on the filmstrip 47, e.g. in the form of a bar code, a pattern, or characters, prior to the development. It is possible to use an IC memory for recording the encryption key data. The IC memory may be incorporated into the cartridge shell, or may be integrated in a separate card.

Figure 8:
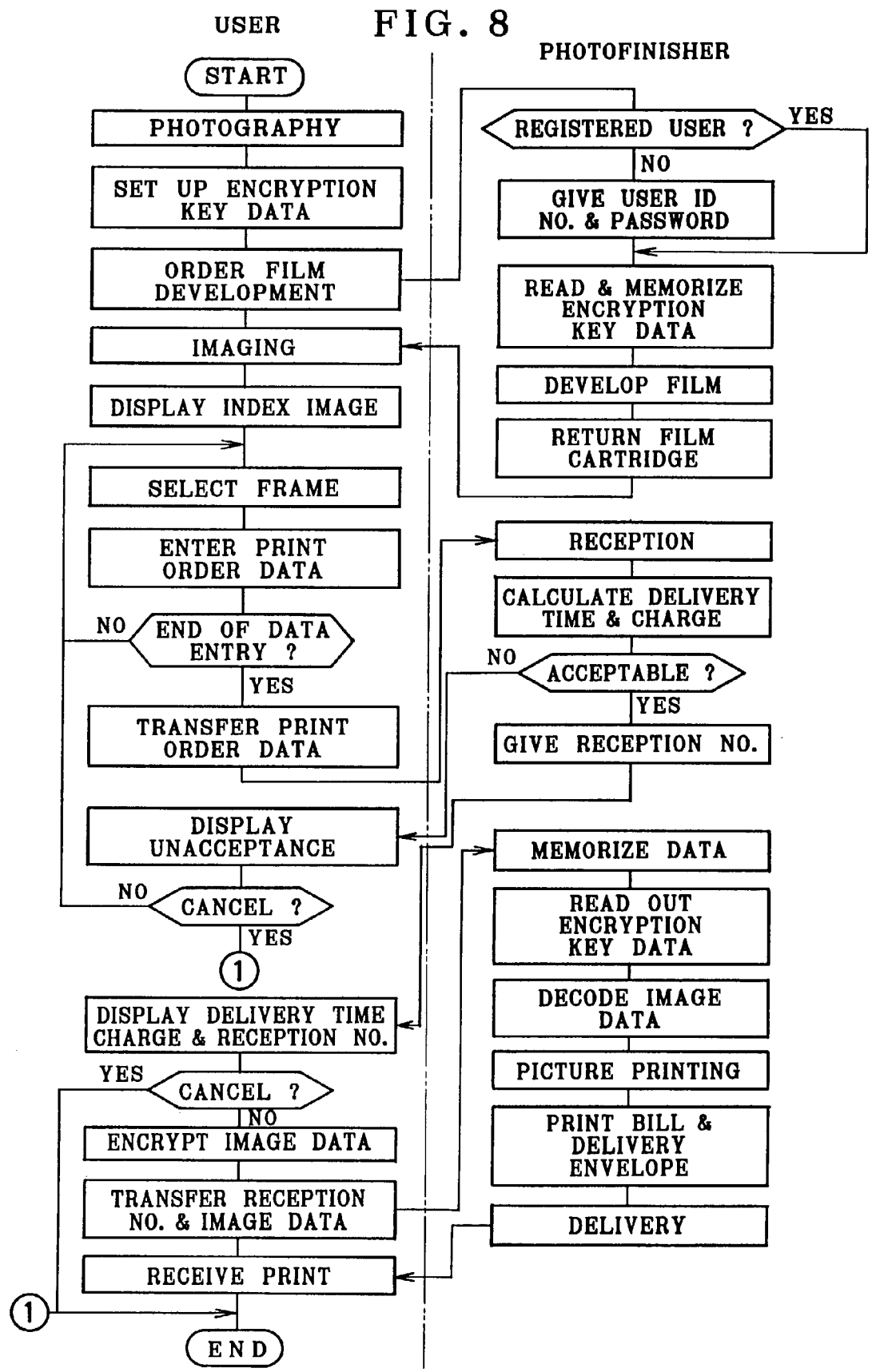
FIG. 8 is a flow chart illustrating another operation sequence of the digital printing system of FIG. 5.

According to another embodiment, as shown in FIG. 8, the user 10 sets up a private encryption key and records data of the encryption key on the magnetic recording layer of the filmstrip 47 by use of the film scanner 11 or a magnetic recording device incorporated into a camera. For this embodiment, the interior of the film scanner 11 must be light-tight. It is possible for the user 10 to record the encryption key data optically on the filmstrip 47 or electronically on a recording medium such as an IC memory. In any case, the encryption key data is recorded in association with the date of setting up the encryption key data, so the encryption key data is always updated.

Since the user can set up the same encryption key as another user's by coincidence, the photofinisher 13 should check if a newly set encryption key is not coincide with any encryption keys of other registered users. If the newly set encryption key coincides with one of the registered encryption keys, the photofinisher 13 modifies the new one to differentiate from the older one, and records the modified encryption key data on the magnetic recording layer of the filmstrip 47 or on another type of recording medium. Then, the photofinisher 13 should inform the user 10 of the modification, e.g. by recording warning data along with the modified encryption key data.

In alternative, the user 10 may set up the encryption key at the photofinisher 13 when ordering a film development. The photofinisher 13 checks the coincidence of the encryption key data and, if necessary, requests the user 10 for modification. Thereafter, the encryption key data is stored in the memory 15, and recorded on the filmstrip 47 by the film processor 21 or the like.

It is also possible to set up an encryption key for each photo filmstrip, rather than for each user.

In the above embodiments, the silver-salt color digital printers 16 and 17, and the ink jet color printer 18 are installed in the photofinisher 13. Besides these, thermal developing-transferring type color printers, color thermal printer, and color Laser printers are applicable. Of course, a monochrome printer is used for making black-and-white prints.

It is possible to order multiprinting, seal-printing, letter-merged printing, or black-and-white printing by the print option data. The seal-printing is to print an image on a sheet with releasing paper, so the printed image may be used as a seal or sticker.

It is possible to add data of designating manual image correction to the print option data. In that case, the operator observes a video image simulating a finished photo-print, and corrects the image data so as to obtain optimum density and color balance. An extra charge for the correction will be added to the print charge.

It is also possible that the film scanner 11 sends the photofinisher 13 photographic data useful for print quality improvement that is read from the magnetic recording layer of the filmstrip 47. The film scanner 11 of the present invention may be used for transferring image data from a TV or a video player to the photofinisher 13 in order to make a hard copy of a video image frame.

Meanwhile, it is known in the art that negative photo films in general have more or less different coloring characteristics even between those having the same film speed, according to the manufacturer, the environments on the manufacture etc. Besides, the coloring densities vary depending upon the conditions of the development. Therefore, it is necessary to compensate for the variations in the coloring characteristics, in order to get equally adequate quality of prints from any photo films. As one method for this purpose, a test pattern or check pattern is optically recorded on the negative film at a photo-lab before the development, to measure the three color densities of the test pattern after the development. Correction values are derived from the measured three color densities of the test pattern, and are used for correcting exposure values of three colors on printing.

Thus, test patterns have conventionally been used only for correcting the variation in the coloring densities of the negative films. According to a printing method of the present invention, an attractive picture for the client is used as the test pattern, and is printed with other picture frames, to serve as a complimentary photograph.

Figure 9:
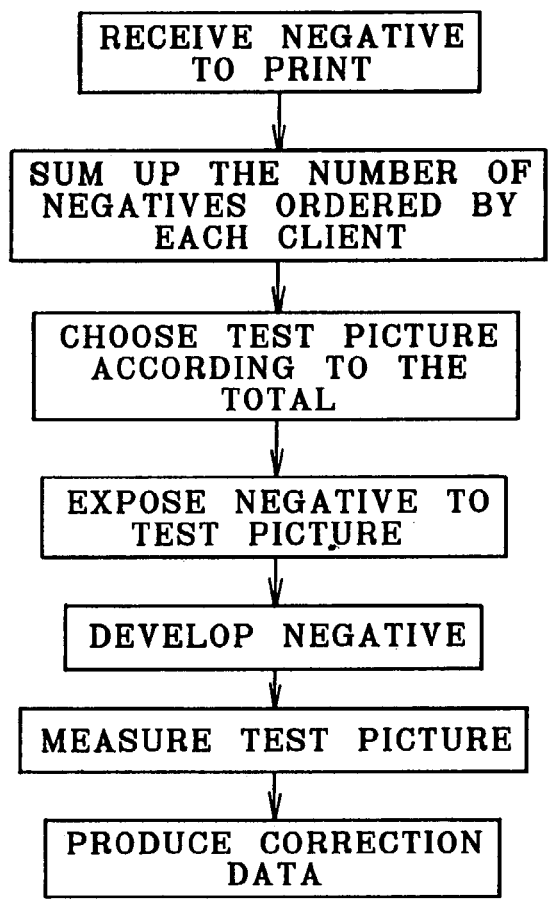
FIG. 9 is a flow chart illustrating a sequence of producing correction data by use of a test picture recorded on a filmstrip.

As shown in FIG. 9, an exposed negative filmstrip is forwarded to a photofinisher or its agency for printing. The photofinisher enters client ID data and content of order through a reception processing device. The reception processing device produces client database from entered contents of orders.

The client ID data is to identify each individual client, and is initially registered at the photofinisher with other information about the client, such as client's address, age, sex etc. It is preferable to record the client ID data on a memory card, and issue it as an ID card to each client. Then, the photofinisher can enter the user ID data without fail by use of the ID card. The client database consists of a plurality of data files, one file for each client. Each data file consists of the date of printing order, the type of film such as the manufacturer, the film speed, and the film length, the type of print, and the bill. The data file also includes the total number of negatives that have been ordered by the same client.

As for the IX240 type negatives, it is possible to provide a camera with a data setup device for setting up the client ID data, and record the client ID data on a transparent magnetic recording layer of the negative filmstrip automatically by the camera. It is also possible that the camera sums up the number of negative filmstrips that have been exposed by the camera, and records the total on the magnetic recording layer of the IX240 type film.

The photofinisher stores data of a large number of test pictures. According to the total number of negative filmstrips, one test picture is chosen among the stored test pictures. In this way, a different test picture is chosen for each negative filmstrip of the same client, so each client does not get the same complimentary photograph as before, but always gets a different complimentary photograph.

As the test pictures are stored such pictures that many people would be pleased to get them, e.g., famous landscapes, famous constructions, portraits of popular actors, actresses, sports players and so forth. Because the clients have different tests in photographs from each other, it is desirable to enter the preference of each individual client in the database, and choose a test picture from those preferable for the client. It is possible to put an ad in the test picture.

It is necessary to prepare so many test pictures that an ordinary capacity memory of a small-scale photo lab is not sufficient to store and manage all of the test pictures. Therefore, the small-scale photo-lab had better to store and manage data of those test pictures which are frequently used, whereas a photo-lab center stores and manages data of those being rarely used. The small-scale photo-lab retrieves the data of the test picture from the photo-lab center through a communication circuit. Networking small-scale photo-labs through the photo-lab center makes it easy to revise the test pictures simultaneously in every photo-lab.

A test picture is selected from the stored test pictures according to the total of the negative filmstrips that the client have ever ordered to print, while considering the client's taste. The test picture is optically recorded on an unexposed leading or trailing end portion of the negative filmstrip by a video printer, e.g. a Laser printer, a CRT printer, an LCD printer. The video printer controls exposure according to the film speed. Ideal characteristic value data is appended to each test picture. The ideal characteristic values may be ideal densities and color distributions of the test picture, ideal pixel densities of the negative image of the test picture, or ideal densities of the consequent print.

When the negative filmstrip is of IX240 type, the ideal characteristic value data is written on the magnetic recording layer of the negative filmstrip. When the negative filmstrip is of ISO135 type, the ideal characteristic value data is written on a memory of a device for calculating correction values. In that case, an ID number is given to each individual test picture and its ideal characteristic value data, so the ID number is used as an address for retrieving the ideal characteristic value data from the memory.

After the test picture is recorded, the negative filmstrip is developed in a film processor. The developed filmstrip is put in a scanner to measure the densities of the test picture. Then, correction data is derived from differences between the measured values and the ideal characteristic values, the differences being dependent upon the condition of development and the film type.

As the correction data, a correction table is used for the digital printers, and well-known exposure correction values are used for frame exposure type printers. In the correction table, each level of measured actual densities, (i.e., image data of the test picture) are correlated with corrected densities ( i.e., normalized image data). Thus, image data of picture frames to print may be converted into corrected image data through the correction table. As for color images, it is necessary to correct color balance and density, so that the correction data is produced for each of the three primary colors. As for black-and-white images, the correction data is used for density correction only.

The correction data is transferred to the printer by way of a cable system or a radio system, or a recording medium like a memory card. Concerning the IX240 type negative filmstrips, the correction data may be written on the magnetic recording layer. Then, the correction data is available on reprinting.

When pictures are printed on photographic paper in the printer, density and color balance of the test picture and the picture frames to print are corrected by use of the correction data. An add copy may be printed on the obverse or the reverse surface of the photographic paper. It is possible to write data of the add copy on the magnetic recording layer of the IX240 type filmstrip.

Figure 10:
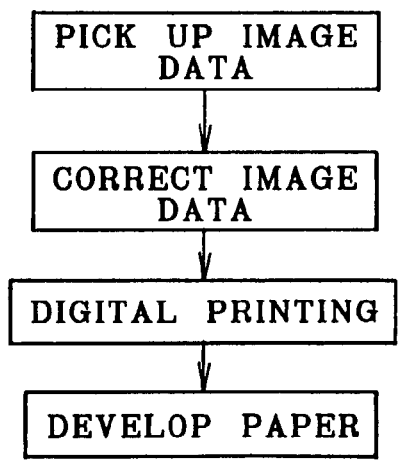
FIG. 10 is a flow chart illustrating a sequence of digital printing.

As shown in FIG. 10, when using a digital video printer, image data of the test picture and the picture frames to print is picked up by the scanner, and is corrected by use of the correction table. The digital video printer makes prints of the test picture and the other picture frames based on the corrected image data. In the frame exposure printer, the exposure amount is controlled by changing exposure time or filter insertion amounts according to exposure correction values that are derived from differences between actually measured LATD (Large Area Transmittance Density) and ideal LATD included in the ideal characteristic value data.

Figure 11:
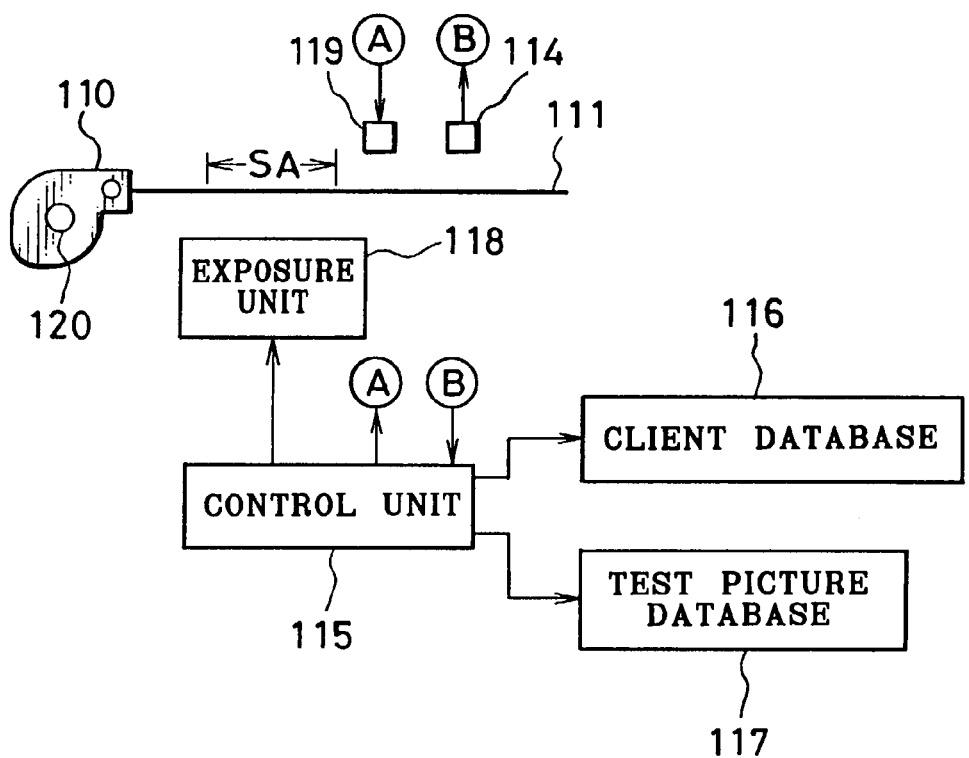
FIG. 11 is a schematic diagram of a recording device for photographically recording test pictures on negative filmstrips.

FIG. 11 shows an embodiment of recording device for photographically recording test pictures on negative filmstrips. An IX240 type photo film cartridge 110 contains a negative filmstrip 111 exposed by a client. When a spool 112 of the cartridge 110 is rotated in an unwinding direction, the exposed negative filmstrip 111 is advanced out of the cartridge 110. As a trailing end portion SA of the IX240 type filmstrip 111 is maintained unexposed by the camera, a test picture is recorded on the trailing end portion SA.

Client ID data is recorded on a magnetic recording layer of the negative filmstrip 111 by the camera or the reception processing device. The client ID data is read through a reading head 114, and is sent to a control unit 115. The control unit 115 retrieves the total of the negative filmstrips that have been ordered to print by the client, from a client database 116 by use of the client ID data. Thereafter, the control unit 115 counts up the total of the negative filmstrips by one. The client database 16 consists of the total number of negatives that have been ordered by the individual client, in association with information about the individual client. After counting up the total of the negative filmstrips, the control unit 115 reads out the total from the client database 116.

A test picture database 117 stores image data of a plurality of test pictures and ideal characteristic value data of each test picture, wherein the test pictures are grouped such that one group is allocated to each number of totals of the negative filmstrips. The control unit 115 reads out data of one of the test pictures and its ideal characteristic value data from the test picture database 117. The image data is sent to an exposure unit 118, whereas the ideal characteristic value data are sent to a writing head 119.

In this embodiment, the exposure unit 118 is a Laser type digital video printer. The exposure unit 118 records the selected test picture on the unexposed trailing end portion SA of the negative filmstrip 111 at an exposure value determined by the speed of the negative filmstrip 111, such that the pixel densities of the test picture would be ideal if the coloring characteristics of the negative filmstrip 111 are normal, and the developing condition is ideal.

As the ideal characteristic value data, positions of designated pixels and ideal negative density of each of the designated pixels are used for the digital video printer. The ideal characteristic value data is written on the magnetic recording layer of the filmstrip 111 by the writing head 119. After the test picture is recorded in this way, the negative filmstrip 111 is developed by a film processor.

Figure 12:
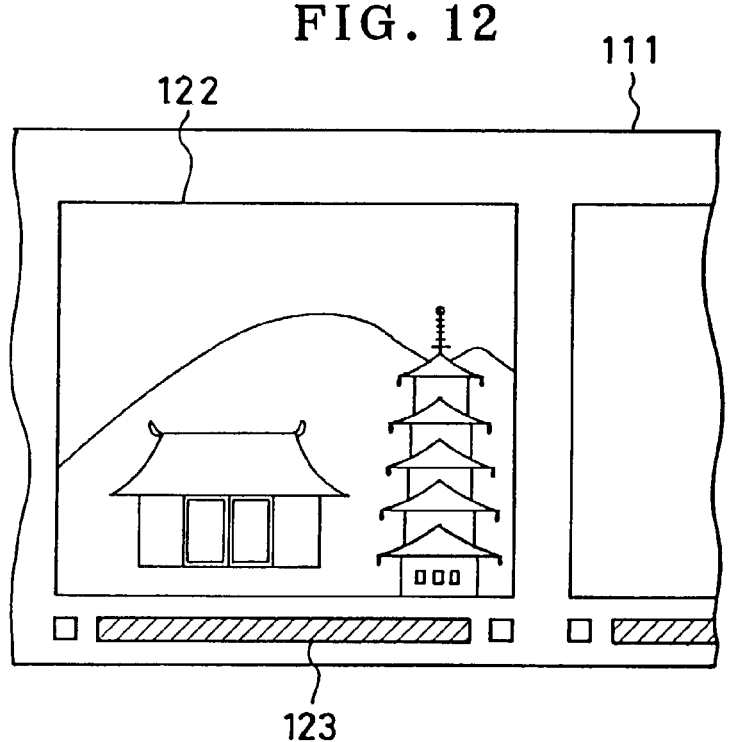
FIG. 12 is an explanatory view of a test picture recorded on a negative filmstrip.

FIG. 12 shows an example of test picture 122, wherein the ideal characteristic value data concerning this test picture 122 is recorded on a magnetic track 123 on one side of the test picture 122.

Figure 13:
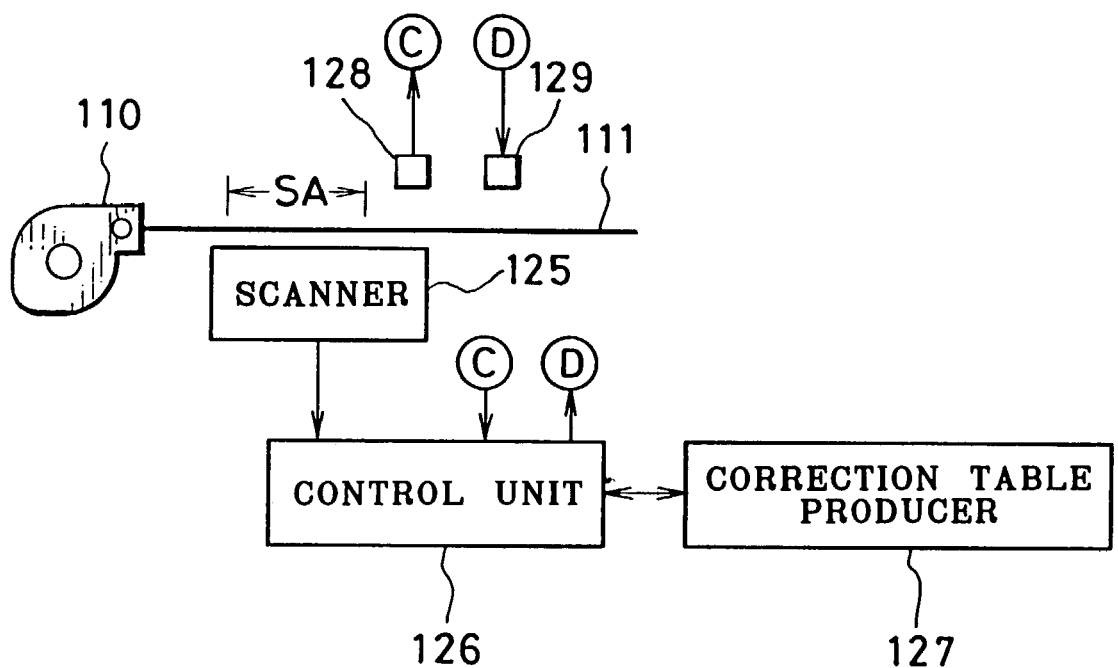
FIG. 13 is a schematic diagram of a device for detecting correction data from the test picture recorded on the filmstrip.

FIG. 13 shows a device for detecting correction data based on image data of the test picture 122, which is recorded on the trailing end portion SA in this instance. A scanner 125 consists of a lens system and an imaging device, and measures density of each pixel of the test picture 122 on the negative filmstrip 111. The measured actual negative densities of the test picture 122 are fed to a correction table producer 127 through a control unit 126. Simultaneously, a reading head 128 reads out the ideal characteristic value data from the magnetic track 123, and sends it to the correction table producer 127 through the controller 126. It is preferable to include data defining the size of each pixel in the ideal characteristic value data.

The correction table producer 127 extracts from the measured negative densities of the test picture 122, densities of those pixels designated by the ideal characteristic value data. If the coloring characteristics of the negative filmstrip 111 are normal, and the developing condition is ideal, the measured negative densities would be equal to the ideal negative densities of the same pixels, as implied by dashed line in FIG. 15.

Figure 15:
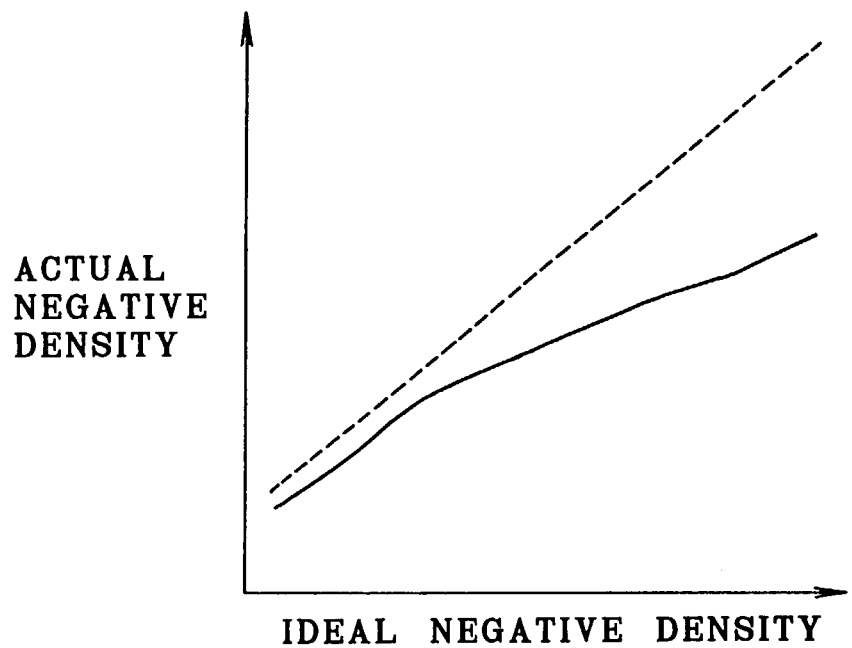
FIG. 15 is a graph showing a relationship between ideal negative densities of a test picture and actual negative densities measured from the test picture recorded on a negative filmstrip.

In practice, because of the variation in the coloring characteristics and in the developing conditions, the actual negative densities of the test picture is diverse from the ideal characteristic curve as shown for example by a solid line in FIG. 15. Thus, a difference between the actual value and the ideal value is detected as a correction value at each density level. In this example, the actual densities are lower than the ideal densities in the whole range. Therefore, a deficiency of density is calculated at each designated pixel, to produce a correction table corresponding to a conversion curve shown by slid line in FIG. 16. The correction table is written on the magnetic track 123 by a writing head 129.

Figure 16:
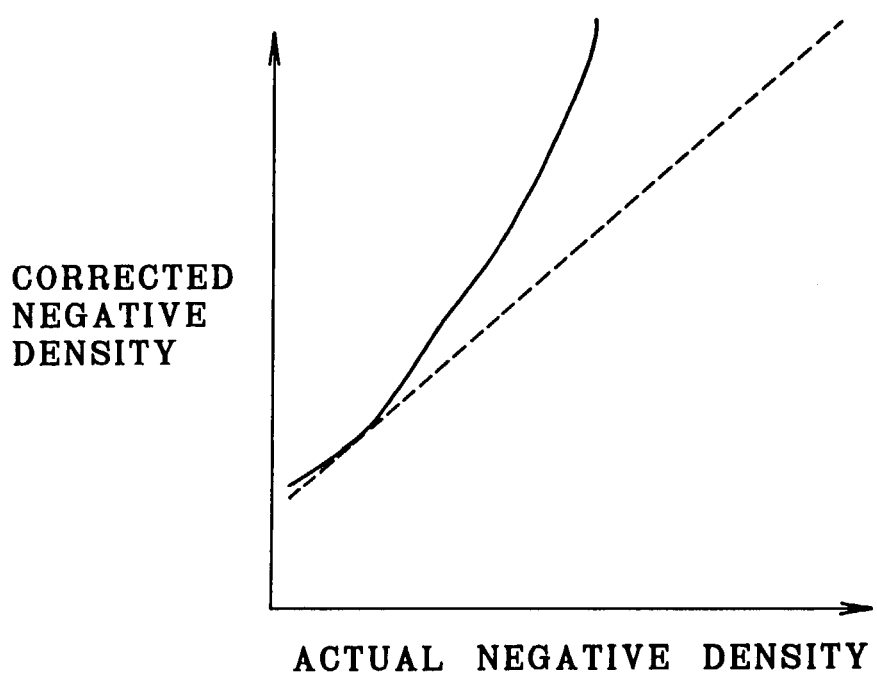
FIG. 16 is a graph showing a relationship between the actual negative densities and corrected negative densities.

To print the test picture and the other picture frames, the photo film cartridge 110 is put, for instance, in a Laser type digital video printer. Then, the digital video printer reads out the correction table from the magnetic track 123. By use of the correction table, the image data of each pixel, which corresponds to an actual negative density of FIG. 16, is converted into corrected image data, which corresponds to a corrected negative density of FIG. 16. Intensity of the Laser beam is modified in accordance with the corrected image data, printing the test picture and the other picture frames on photographic paper.

Although the correction data detecting device of FIG. 13 is separate from the printer, it is possible to incorporate such a device into a printer. In that case, a scanner should be placed before a printing station of the printer, and a correction table is written in a table memory.

Figure 14:
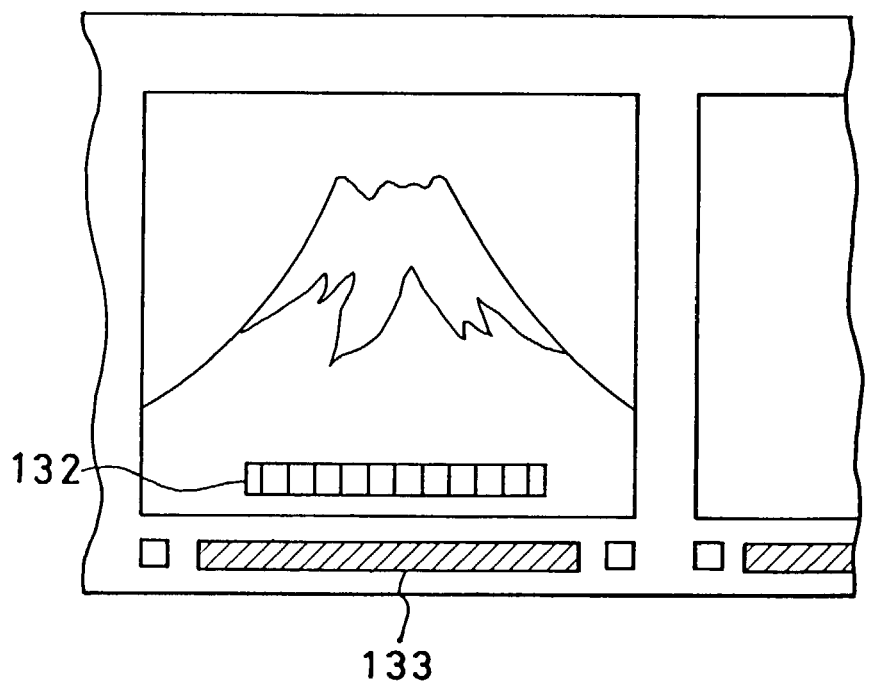
FIG. 14 is an explanatory view of a test picture having a density chart therein.

According to another embodiment shown in FIG. 14, a density chart 132 is recorded in combination with a test picture, and ideal negative densities of the density chart 132 is recorded on a magnetic track 133. Actual negative densities are measured from the density chart 132. A correction table is produced from differences between the actual negative densities and the ideal negative densities, in the same way as above.

Figure 17A:
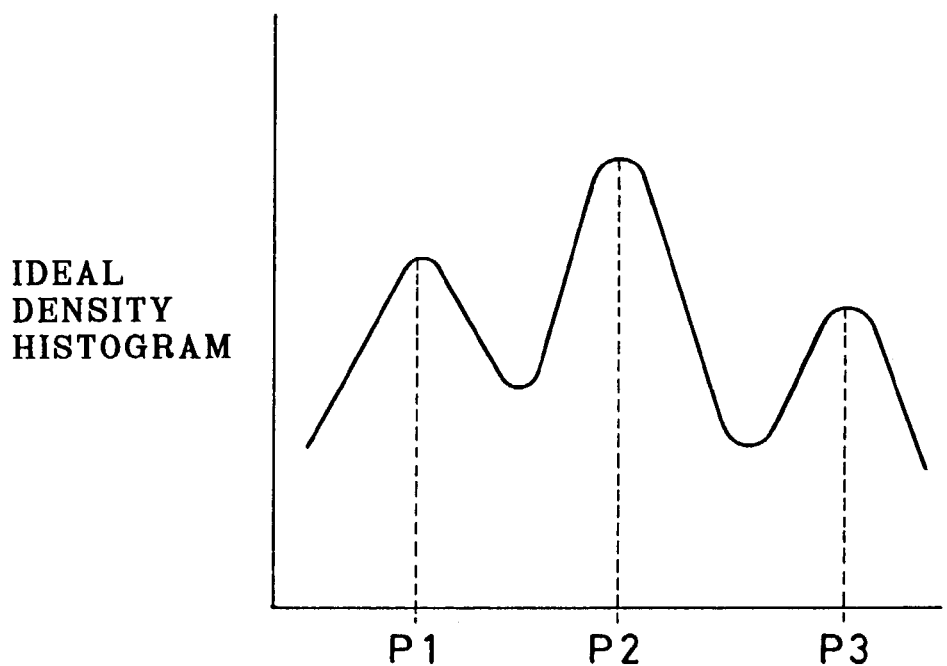
FIG. 17A is an ideal density histogram of a test picture.
Figure 17B:
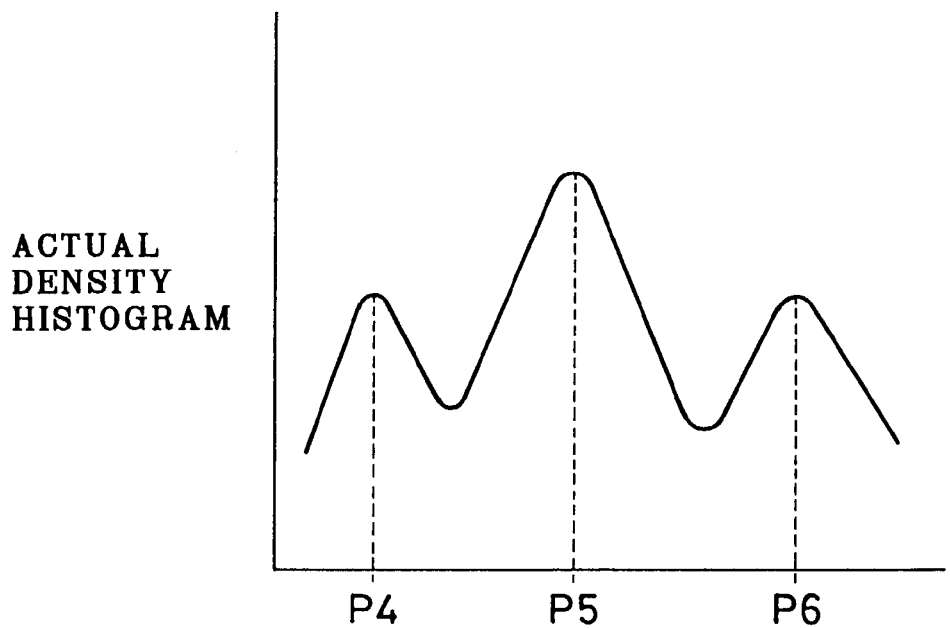
FIG. 17B is an actual density histogram obtained from the test picture recorded on a negative filmstrip.

It is possible to use density histogram for detecting correction data. FIG. 17A shows an example of ideal density histogram appended to a test picture. Peak values P1, P2 and P3 of the ideal density histogram are written as ideal characteristic value data on a magnetic track of the negative filmstrip 111 besides the test picture. After the filmstrip 111 is developed, pixel densities of the test picture are measured to get a density histogram. FIG. 17B shows an example of density histogram of the test picture. A correction table is produced from the deviations of peak values P4, P5 and P6 of the actual density histogram from the peak values P1, P2 and P3 of the ideal density histogram.

Since common people use less than a dozen filmstrips, if all the test pictures are renewed every month, the client mostly get a different complimentary photograph for each exposed filmstrip. Therefore, it is possible to record the test picture on the individual negative filmstrip during the manufacture, while renewing the test picture at regular intervals.

When recording the test picture at the factory, the manufacturer records the ideal characteristic value data on the magnetic recording layer if the negative filmstrip is of IX240 type. As for the ISO135 type, the manufacturer records an ID number of each kind of test picture with the test picture, while providing the photo-labs with a table showing a relationship between ID numbers and respective kinds of test pictures, as well as the ideal characteristic value data of the respective test pictures. Thus, the photofinisher retrieves the ideal characteristic value data in correspondence with the ID number, and uses it for controlling print-exposure. It is possible to record the ID number of the test picture on the magnetic recording layer of the IX240 filmstrip. It is also possible to identify the test picture by the picture pattern matching, instead of the ID number.

It is preferable to photography test picture on a filmstrip contained in a lens-fitted photo film unit through a taking lens of the film unit in the factory before the shipment. The ideal characteristic value data or the ID number of the test picture may be recorded on the magnetic recording layer of the filmstrip before the filmstrip is packed in the film unit. In that case, the developed test picture is compared to the original test picture. The difference in shape, i.e. the dimensional difference, from the original are used for compensating for the aberration of the taking lens. The ideal characteristic value data is used for correcting shading and blur amount.

As described so far, the present invention should not be limited to the embodiments shown in the drawings but, on the contrary, various modifications will be possible for people skilled in the art without departing from the scope of claims attached hereto.

What is claimed is:

1. A digital printing system comprising:
   A. data inputting means for inputting an image data of a frame to be printed and print order data, said print order data including at least a print size and a print number;
   B. compressing means for compressing said image data at a compress rate in accordance with said print size;
   C. data transmitting means for transmitting said compressed image data and said print order data;
   D. data receiving means for receiving said compressed image data and said print order data which are transmitted from said data transmitting means; and
   E. a digital printer for printing said frame on the basis of said image data and said print order data;
   wherein said data inputting means, said data compressing means, and said data transmitting means are located at a user; and
   said receiving means and said digital printer are located at a photofinisher.

2. A digital printing system as claimed in claim 1, wherein said compress rate becomes higher as said print size becomes smaller.

3. A digital printing system as claimed in claim 2, wherein said data transmitting means and said data receiving means are connected through a network.

4. A digital printing system as claimed in claim 2, wherein said data inputting means, said data compressing means, and said data transmitting means are included in a personal computer.

5. A digital printing method, comprising the steps of:
   A. inputting an image data of a frame to be printed and print order data, said print order data including at least a print size and a print number;
   B. compressing said image data at a compress rate in accordance with said print size;
   C. transmitting said compressed image data and said print order data from a data transmitting means;
   D. receiving said compressed image data and said print order data from said data transmitting means; and
   E. printing said frame on the basis of said image data and said print order data;
   wherein said data inputting means, said data compressing means, and said data transmitting means are located at a user; and
   said receiving means and said digital printer are located at a photofinisher.

6. A digital printing system as claimed in claim 5, wherein said compress rate becomes higher as said print size becomes smaller.

7. A print processing system comprising:
   at least one printer;
   a work station for receiving print order data comprising a print size, the number of prints, and expected delivery time, said work station calculating delivery time of the received print order in consideration of processing capacity of said printer and total number of presently accepted orders, said work station sending a message of unacceptance to a user so as to instruct said user to change said expected delivery time, or to cancel said print order when the calculated delivery time exceeds said expected delivery time.

8. A print processing system as claimed in claim 7, wherein said work station calculates a print charge based on said print order data, and instructs said user to send said image data to be printed after sending said delivery time and said print charge to said user when said delivery time is no later than said expected delivery time.

9. A print processing system as claimed in claim 8, wherein a reception number is sent to said user along with said delivery time and said print charge.

10. A print processing system as claimed in claim 9, wherein said work station instructs said printer to print based on said print order data after receiving said reception number and said image data from said user.

11. A print processing system as claimed in claim 10, wherein said work station controls said printer so as to print in order of said delivery time based on the print orders.

12. A print processing system comprising:
    plural printers; and
    a work station for receiving a print size and print order data comprising the number of prints and expected delivery date from a user, said work station including a delivery time calculator for receiving said print order data and calculating a delivery time and a printer selection means for selecting one of said plural printers.

13. A print processing system as claimed in claim 12, wherein said work station further comprises a transmitter for sending a message of unacceptance to said user so as to instruct to change said expected delivery time or to cancel said print order.

14. A user operating device comprising:
    A. data inputting means for inputting an image data of a frame to be printed and print order data, said print order data including at least a print size and a print number;
    B. compressing means for compressing said image data; and
    C. data transmitting means for transmitting said compressing image data and the print order data to a device which is located at a photofinisher, said photofinisher printing said frame with a digital printer on the basis of said image data and said print order data.

15. A device as claimed in claim 14, wherein said data transmitting means is connected through a network.

16. A device as claimed in claim 15, wherein said user operating device is a personal computer.

17. A device as claimed in claim 14, wherein said print order data further includes an expected delivery time.

18. A digital printing system comprising:
    A. data inputting means for inputting an image data of a frame to be printed and print order data, said print order data including at least a print size and a print number;
    B. compressing means for compressing said image data;
    C. data transmitting means for transmitting said compressed image data and said print order data;
    D. data receiving means for receiving said compressed image data and said print order data which are transmitted from said data transmitting means; and
    E. a digital printer for printing said frame on the basis of said image data and said print order data.

19. A digital printing system as claimed in claim 18, wherein said data transmitting means and said data receiving means are connected through a network.

20. A digital printing method, comprising:
A. inputting an image data of a frame to be printed and print order data, said print order data including at least a print size and a print number;
B. compressing said image data;
C. transmitting said compressed image data and said print order data from a data transmitting means;
D. receiving said compressed image data and print order data from said data transmitting means; and
E. printing said frame on the basis of said image data and said print order data.

* * * * *